United States Patent [19]

Hasegawa

[11] Patent Number: 5,146,326
[45] Date of Patent: Sep. 8, 1992

[54] CODED PICTURE INFORMATION DECODING APPARATUS HAVING MEANS FOR IMPROVING PICTURE DISTORTION

[75] Inventor: Makoto Hasegawa, Kawasaki, Japan

[73] Assignee: Fujitsu Limited, Kawasaki, Japan

[21] Appl. No.: 611,638

[22] Filed: Nov. 13, 1990

[30] Foreign Application Priority Data

Nov. 14, 1989 [JP] Japan .................. 1-293845
Nov. 28, 1989 [JP] Japan .................. 1-306605

[51] Int. Cl.⁵ .................. H04N 7/12; H04N 9/64
[52] U.S. Cl. .................. 358/135; 358/136; 358/12; 358/166; 358/37
[58] Field of Search .......... 358/135, 136, 11, 12, 358/166, 167, 36, 37; 382/56

[56] References Cited

U.S. PATENT DOCUMENTS

| | | | |
|---|---|---|---|
| 4,504,860 | 3/1985 | Nicol et al. | 358/133 |
| 4,704,628 | 11/1987 | Chen et al. | 358/135 |
| 4,807,029 | 2/1989 | Tanaka | 358/135 |
| 4,958,226 | 9/1990 | Haskell et al. | 358/135 |
| 4,972,260 | 11/1990 | Fujikawa et al. | 358/135 |
| 4,984,076 | 1/1991 | Watanabe et al. | 358/133 |
| 4,985,768 | 1/1991 | Sugiyama | 358/135 |

FOREIGN PATENT DOCUMENTS 63-103583 5/1988 Japan .
63-197185 8/1988 Japan .
63-246089 10/1988 Japan .

Primary Examiner—John K. Peng
Attorney, Agent, or Firm—Nikaido, Marmelstein, Murray & Oram

[57] ABSTRACT

A coded picture information decoding apparatus includes a decoder part for decoding a code word corresponding to a serious of transfer coefficients obtained by carrying out a discrete cosine transform for picture information to be transmitted in a block unit obtained by dividing the picture information on a coder side and for reproducing the series of transfer coefficients, and an inverse transform part for carrying out an inverse discrete cosine transform for the series of transfer coefficients reproduced by the decoder part in the block unit and for outputting reproduced picture information. The apparatus also includes a prediction part for predicting, in the block unit, whether or not a picture distortion will occur on the basis of the transfer coefficients obtained in the block unit and for outputting a prediction result obtained in the block unit. Further, the apparatus includes an image processing unit for carrying out a predetermined image process of preventing the occurrence of the picture distortion for the reproduced picture information related to a block indicated by the prediction result showing that the occurrence of the picture distortion is predicted.

14 Claims, 13 Drawing Sheets

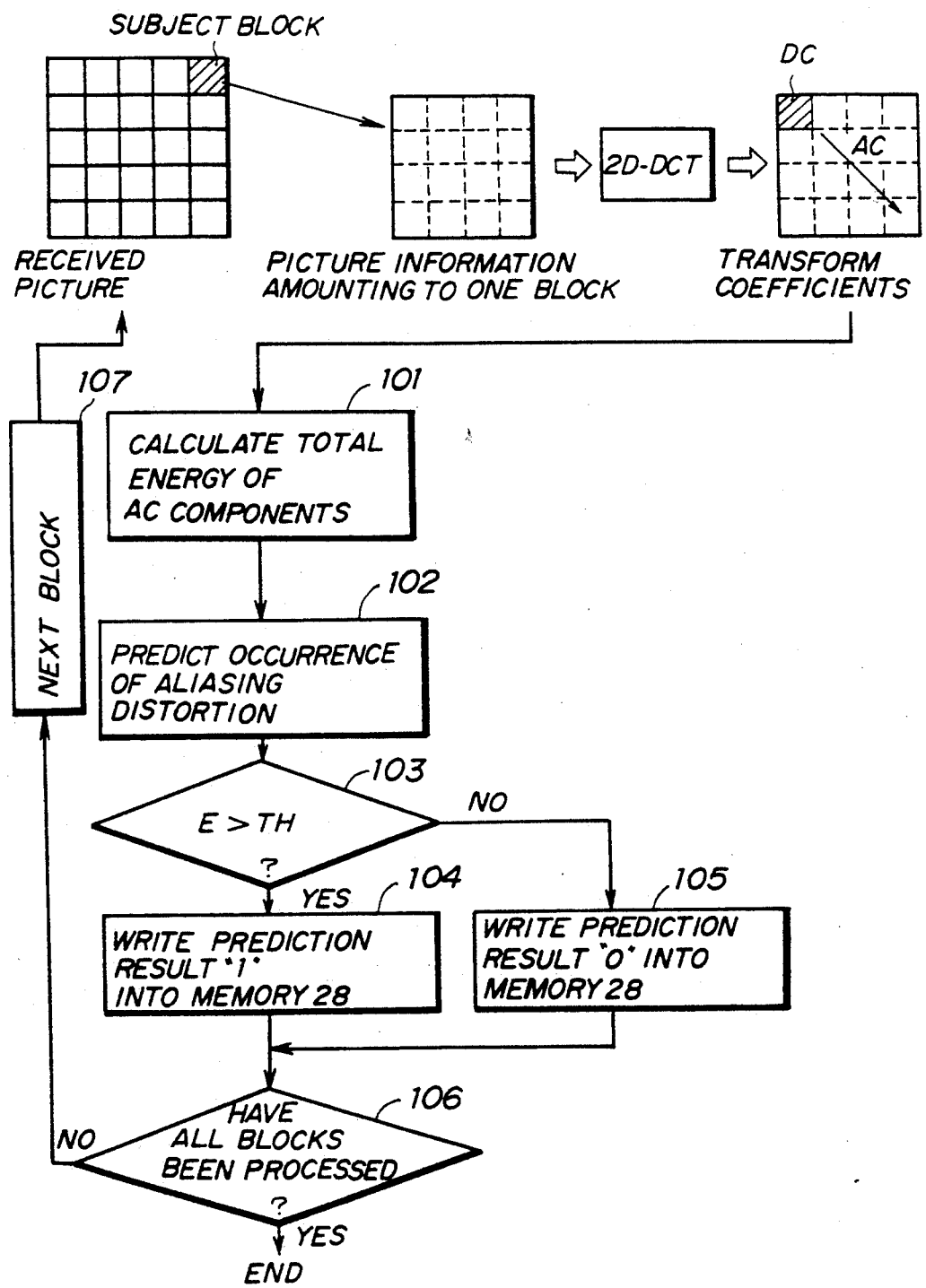

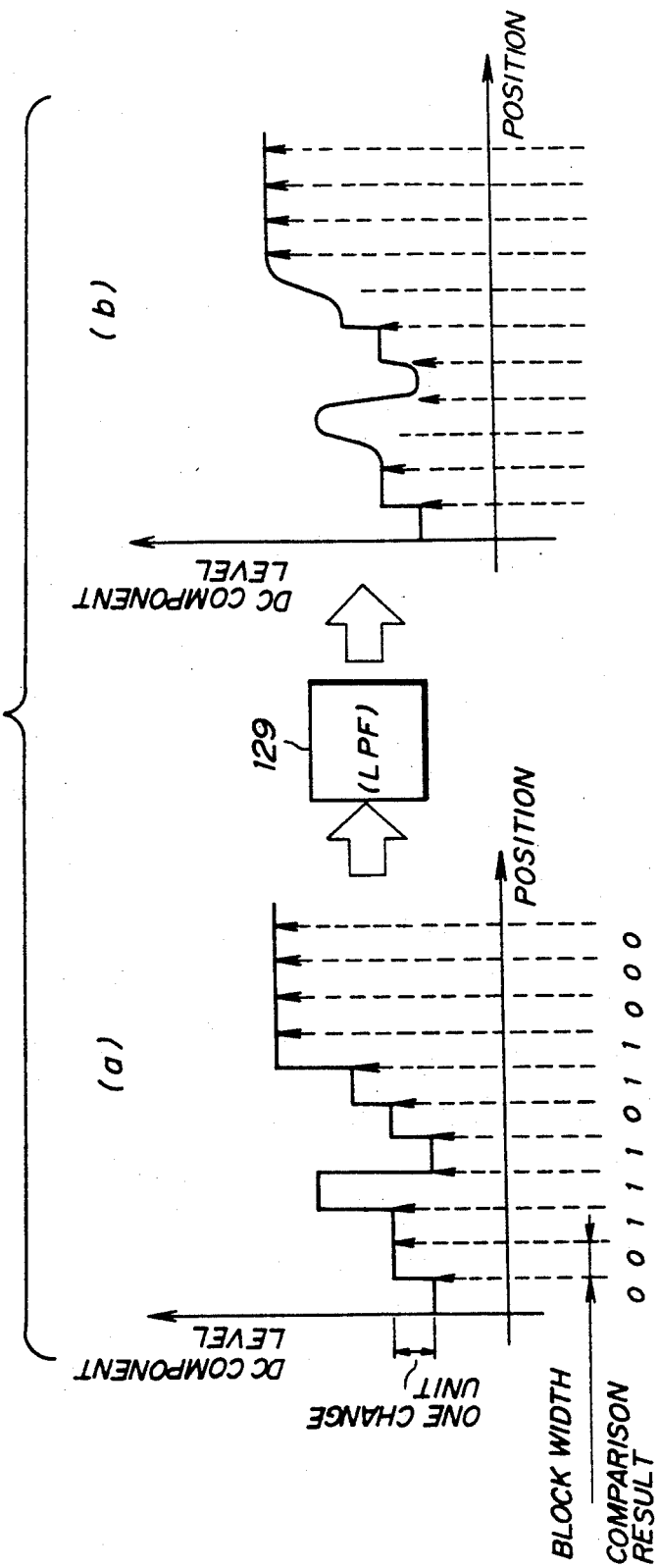

CODED PICTURE INFORMATION DECODING APPARATUS HAVING MEANS FOR IMPROVING PICTURE DISTORTION

BACKGROUND OF THE INVENTION

The present invention generally relates to an improvement in the picture quality in a picture (video) coding system, and more particularly to an improvement in a picture distortion, such as a an aliasing distortion or a block distortion, in a picture coding system, particularly, a two-dimensional discrete cosine transform coding system.

In a transform coding system using a two-dimensional discrete cosine transform, an original picture is divided into blocks on a transmitter side. Each of the blocks has a fixed size. A two-dimensional forward discrete cosine transform is carried out for each of the blocks, so that transform coefficients are obtained in a unit of block. Then, the transform coefficients are coded, so that a large amount of information on the original picture is compressed. On a receiver side, the coded transform coefficients are decoded, the results of the decoding are subjected to an inverse discrete cosine transform process, so that the original picture is reproduced.

In this case, generally, an infinite number of terms of transform coefficients is needed to subject the transform coefficients obtained by the forward discrete cosine transform to the inverse discrete cosine transform and completely reproduce the original picture information. However, it is actually impossible to handle the infinite number of terms of transform coefficients. For this reason, generally, the discrete cosine transform is carried out based on an approximate equation which expresses a finite number of transform coefficients equal to the number of pixels which form one block. For example, in a case where one block consists of 8×8 pixels, an approximate equation expressing 64 transform coefficients is used.

Thus, it is impossible to completely reproduce a block having a wide distribution of signal levels of pixels, that is, a block having a large amount of high-frequency components, even when such a block is subjected to an inverse discrete cosine transform having a precision equal to that of the forward discrete cosine transform. As a result, there is a possibility that information about a pattern which is not included in the original information is generated. A picture distortion arising from such a cause is called an aliasing distortion or noise. The existence of such an aliasing distortion greatly deteriorates the reproduced picture and provides an impression different from that of the original picture.

From this point of view, in order to configure a high-quality, high-efficient coding system, it is necessary to prevent the occurrence of the aliasing distortion or suppress a visual deterioration of the reproduced picture even when the aliasing distortion occurs.

Similarly, a block distortion must be improved. On the receiver side, the divided blocks are joined together. In a case where neighboring blocks have different characteristics, a boundary between these neighboring blocks visually appears on the reproduced picture. This is called a block distortion or noise. The existence of such a block distortion deteriorates the picture quality. Thus, it is necessary to improve the block distortion.

SUMMARY OF THE INVENTION

It is a general object of the present invention to improve a picture distortion, such as a aliasing distortion or a block distortion, on the receiver side.

This object of the present invention is achieved by a coded picture information decoding apparatus comprising:

decoder means for decoding a code word corresponding to a series of transfer coefficients obtained by carrying out a discrete cosine transform for picture information to be transmitted in a block unit obtained by dividing the picture information on a coder side and for reproducing the series of transfer coefficients;

inverse transform means, coupled to the decoder means, for carrying out an inverse discrete cosine transform for the series of transfer coefficients reproduced by the decoder means in the block unit and for outputting reproduced picture information;

prediction means, coupled to inverse transform means, for predicting, in the block unit, whether or not a picture distortion will occur on the basis of the transfer coefficients obtained in the block unit and for outputting a prediction result obtained in the block unit; and image processing means, coupled to the inverse transform means and the prediction means, for carrying out a predetermined image process of preventing the occurrence of the picture distortion for the reproduced picture information related to a block indicated by the prediction result showing that the occurrence of the picture distortion is predicted.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating the operation of the AC component-based prediction unit shown in FIG. 5;

FIGS. 12A and 12B are diagrams illustrating the operation of an image processing unit shown in FIG. 9.

DESCRIPTION OF THE PREFERRED EMBODIMENTS

Figure 1:
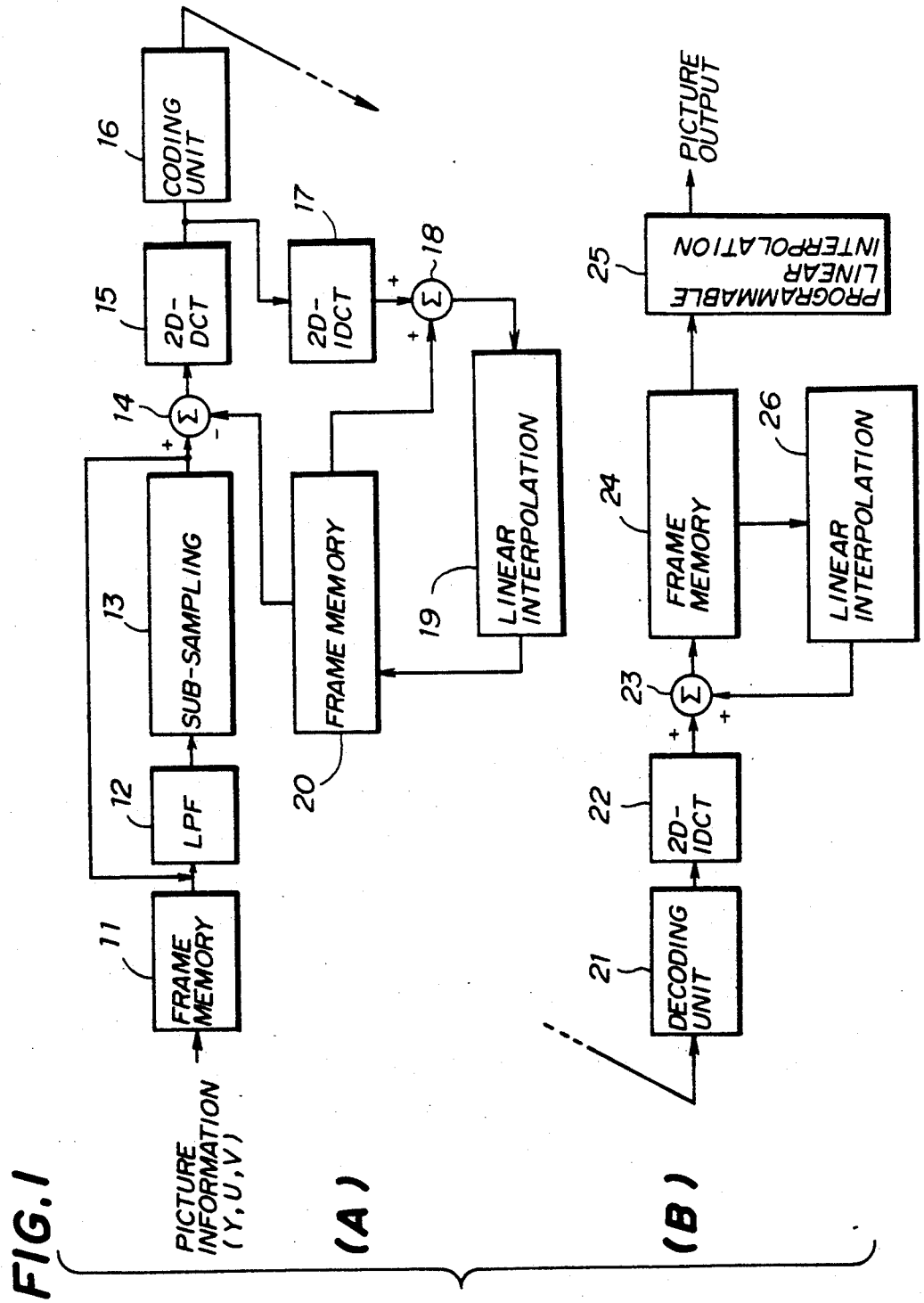
FIG. 1 is a block diagram of an outline of a discrete cosine transform coding system.

A description will now be given of an outline of a discrete cosine transform coding system with reference to FIG. 1. FIG. 1(A) illustrates a transmitter (coder), and FIG. 1(B) illustrates a receiver (decoder). The system shown in FIG. 1 employs a hierarchical coding.

Picture (video) information composed of a luminance signal Y, and chrominance signals U and V is subjected to a preprocessing in a block unit consisting of 8×8 pixels by a preprocessing part composed of a frame memory 11, a lowpass filter (LPF) 12 and a sub-sampling unit 13. More specifically, the picture information stored in the frame memory 11 is filtered through the lowpass filter 12, and then sampled in such a way that a ratio of sampling in the vertical direction to sampling in the horizontal direction is 2:1. Thereby, the picture information is compressed. The compressed picture information is filtered by the lowpass filter 12 again, and then compressed at the above-mentioned sampling ratio by the sub-sampling unit 13. By repeatedly carry out the above-mentioned preprocessing, the amount of compressed picture information is compressed to 1/16 of the amount of the original picture information. The compressed picture information thus obtained is input to a subtracter 14, which subtracts information about a predicted picture supplied from a frame memory 20 from the compressed picture information and generates information on the difference therebetween (information on a differential picture).

The information on the differential picture is subjected to a two-dimensional discrete cosine transform by a two-dimensional discrete cosine transform (2D-DCT) unit 15 in a unit of block consisting of 8×8 pixels, so that a signal (information on the differential picture) in the time domain is converted to a signal (information) in the frequency domain. Thereby, a series of transform coefficients representing the information on the differential picture is generated. A variable length entropy coding unit 16 gives the series of transform coefficients a code word having a minimum length with respect to the series of transform coefficients. In this way, a coded signal consisting of a variable length code is generated. The coded signal corresponds to the information on the differential picture having an amount equal to 1/16 of the original amount.

A two-dimensional inverse discrete cosine transform unit (2D-IDCT) 17 carries out a two-dimensional inverse discrete cosine transform for the information composed of the series of transform coefficients output by the unit 15. Thereby, the differential picture is reproduced. An adder 18 adds the information on the reproduced differential picture and information on the predicted picture supplied from the frame memory 20 in the block unit, and thereby generates information on a reproduced picture. A linear interpolation unit 19 carries out a linear interpolation for the reproduced picture, and generates information a picture in which the amount of information is doubled in the vertical and horizontal directions. The frame memory 20 stores the information on the picture output amounting to one picture plane and output by the linear interpolation unit 19, and generates information on the predicted picture having an amount of compressed information equal to ¼ of the original amount of information.

This picture information having an amount of compressed information equal to ¼ of the original amount of information is subjected to the preprocessing again in the way as described previously. Thereby, a coded signal of the information on the differential picture having the amount of compressed information equal to ¼ of the original amount of information is generated. Further, the linear interpolation is carried out for information on a reproduced picture generated from the above coded signal, so that an amount of information on a predicted picture having the same amount as the original picture is generated. Further, the preprocessing is carried out for the picture information having the same amount as the original picture, so that a coded signal showing the differential picture related to the original picture is generated.

In the receiver shown in FIG. 1(B), a variable length code decoding unit 21 decodes the variable length code sent from the transmitter shown in FIG. 1(A), and thereby reproduces a series of transform coefficients. A two-dimensional inverse discrete cosine transform unit 22 carries out the two-dimensional inverse discrete cosine transform for the series of transform coefficients, so that information on the differential picture is reproduced. An adder 23 adds the information on the differential picture and information on a predicted picture supplied from a linear interpolation unit 26, and generates information on a reproduced picture. A frame memory 24 stores the information on the reproduced picture amounting to one picture plane, so that the original picture is reproduced. A programmable linear interpolation unit 25 carries out the linear interpolation for the information on the reproduced picture at a rate which varies based on the compression ratio, and generates a reproduced picture output signal.

On the other hand, the linear interpolation unit 26 carries out a linear interpolation for the reproduced picture in the frame memory 24, and thereby generates picture information having an amount which is doubled in the vertical and horizontal directions. This picture information is used as information on the aforementioned predicted picture.

Figure 2:
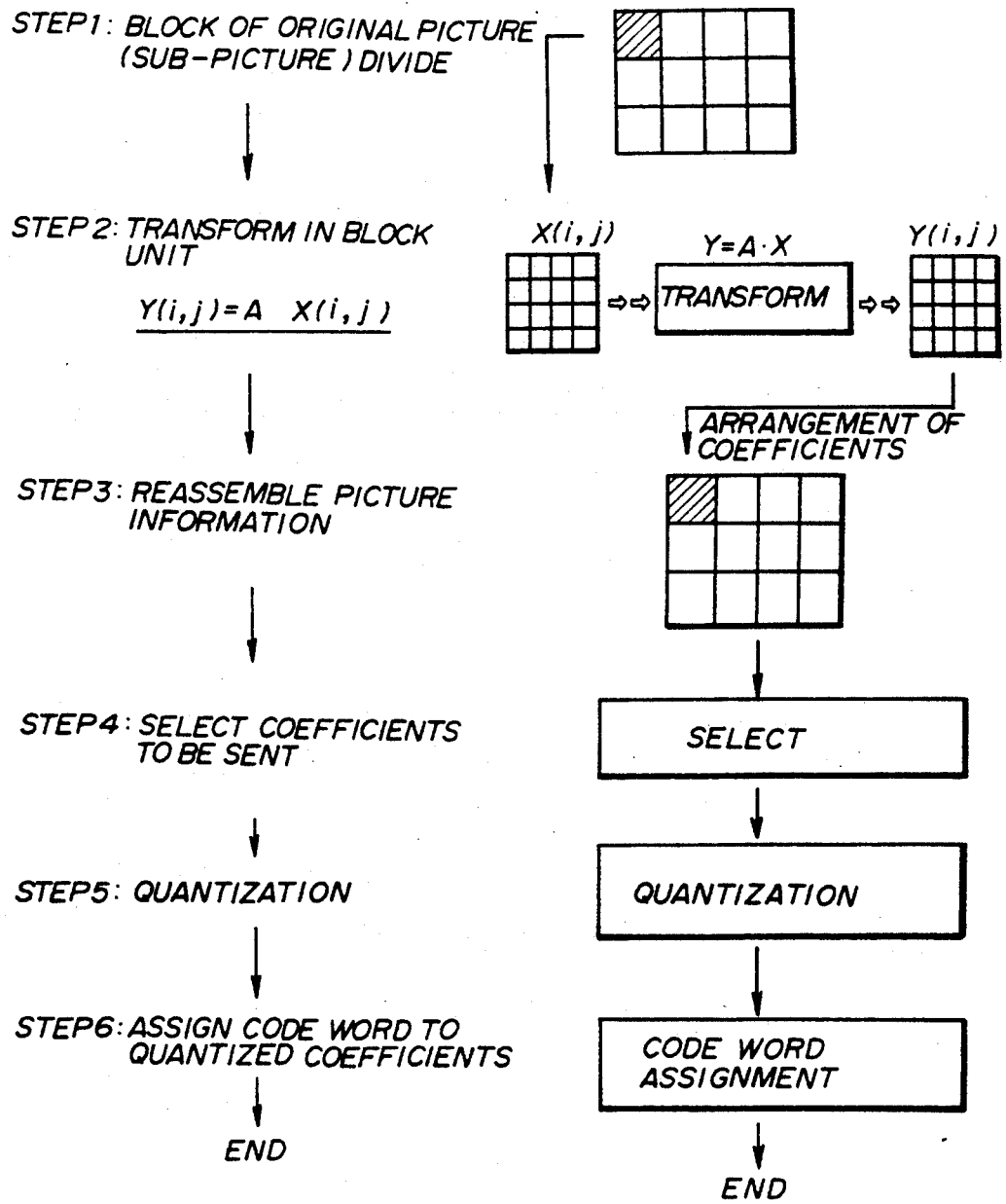
FIG. 2 is a diagram illustrating a fundamental operation of the discrete cosine transform coding system shown in FIG. 1.

Referring to FIG. 2, there is illustrated a fundamental operation of the discrete cosine transform coding system shown in FIG. 1. At step 1, an original picture is divided into blocks, each having a fixed size. Each block is also referred to as a sub-picture. At step 2, the two-dimensional discrete cosine transform is carried out in a unit of block. The two-dimensional discrete cosine transform is expressed as follows:

$$Y(i,j) = A \times X(i,j)$$

where $X(i,j)$ denotes a block of the original picture, A is a constant, and $Y(i,j)$ denotes a transform coefficient arrangement. At step 3, picture information is reassembled by using the transform coefficients obtained in the block unit. At step 4, transform coefficients to be transmitted are selected by a threshold value processing or a sub-sampling process of transform coefficients. At step 5, the selected transform coefficients are quantized, taking into account visual characteristics of the reproduced picture. At step 6, code words are assigned to the quantized transform coefficients.

In the above-mentioned hierarchical discrete cosine transform coding, the coded signal which is first obtained by compressing picture information has a low precision because it has a small amount of information. On the other hand, since the above coded signal can be processed at a high speed, it becomes possible to rapidly send information amounting to one picture plane when the picture plane is changed. Since the amount of information increases each time the coding is repeatedly carried out, the precision increases, and finally, information on the original picture is obtained. Thus, according to the hierarchical discrete cosine transform coding, in a case that still pictures are intermittently switched and transmitted, it becomes possible to prevent the occurrence of a blank on the display, although it takes a long time to start to transmit the first picture plane.

A description will be now given of the aliasing distortion during the above-mentioned hierarchical discrete cosine transform coding. The aliasing distortion arises from the fact that a finite number of transform coefficients is used in the forward and inverse discrete cosine transform procedures. Thus, it is impossible to completely reproduce the original picture.

One may consider the following methods for improving the aliasing distortion. A first method is to reduce the size of one block so that a small distribution of signal levels of pixels in the block is obtained, that is, the high-frequency components are reduced. A second method is to use, as effective coefficients, a number of transform coefficients sufficient to substantially prevent the occurrence of the aliasing distortion. A third method is to increase precision of operation on transform coefficients and reduce an influence of the use of the approximate equation representing a finite number of transform coefficients.

However, the above first through third conceivable methods respectively have the following problems. The first method has a problem in that it needs a large amount of processing time since a large number of blocks forming the picture must be processed. Further, the area of the picture expressed by the once discrete cosine transforming operation decreases, and thus the compression efficiency by coding deteriorates.

The second method has a problem in that a complex operation is needed and an increased number of codes is generated. The third method has a problem in that the discrete cosine transform operation is troublesome and a large amount of hardware is needed to handle high-precision transform coefficients.

It should be noted that the first through third methods need to modify both the transmitter and the receiver. For example, when the transmitter is designed to handle a reduced size of block, it is necessary to design the receiver to handle the same size of block.

Further, in the above-mentioned hierarchical discrete cosine transform coding, the block distortion occurs on the reproduced picture because the reproduced picture is assembled by joining the reproduced blocks together.

One may consider the following methods directed to improving the block distortion. A first method is such that after the picture is assembled by joining the blocks together, and then filtered in its entirety by a lowpass filter in order to smooth the boundary of the neighboring blocks. A second method is to add auxiliary information about the block distortion to the picture image on the transmitter side and correct the received picture information on the basis of the added auxiliary information.

However, the above first method has a problem in that a part of the picture unnecessary for filtering is filtered and thus the reproduced picture deteriorates. The second method has a problem in that the amount of information to be transmitted increases and the coding and decoding algorithms must be exactly the same as each other. If there is a difference between the coding and decoding algorithms, the receiver cannot correct the picture information precisely by using the auxiliary information.

The present invention is directed to overcoming the above-mentioned problems. A description will now be given of a first preferred embodiment of the present invention directed to improving the aliasing distortion.

Figure 3:
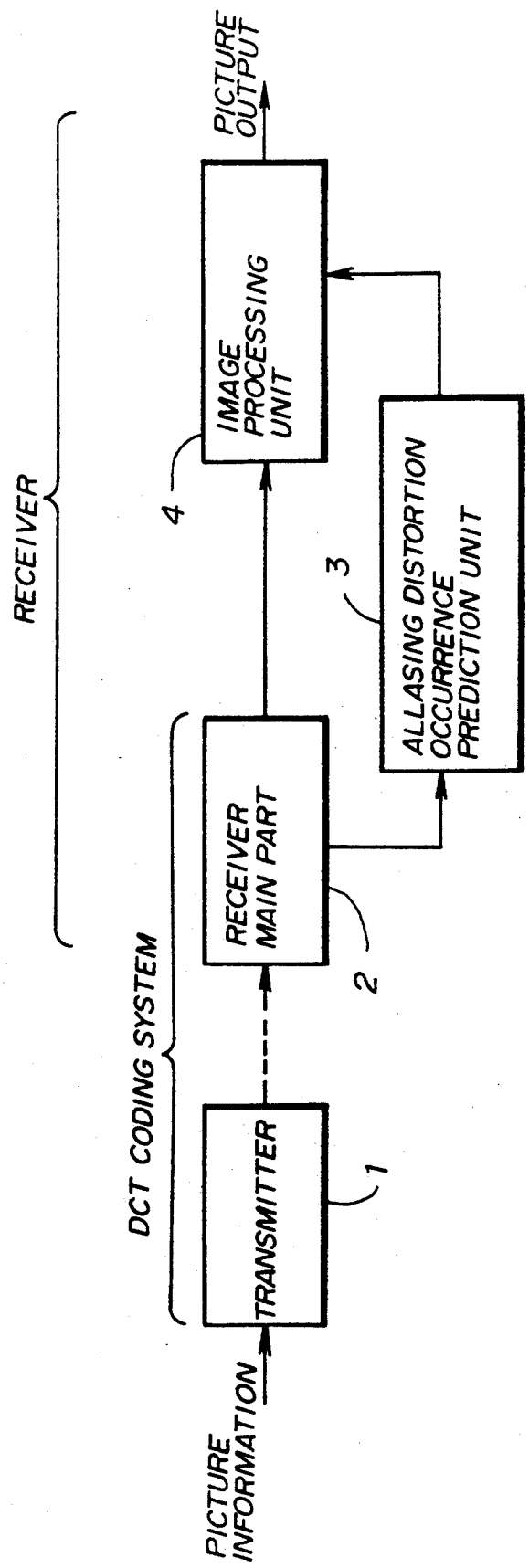
FIG. 3 is a block diagram illustrating a discrete cosine transform coding system having an improved receiver (decoder) according to a first preferred embodiment of the present invention.

Referring to FIG. 3, there is illustrated an outline of the first preferred embodiment of the present invention. A transmitter 1 carries out the two-dimensional discrete cosine transform coding for picture (video) information (more specifically, information on each differential picture) in the block unit and sends code words corresponding to a series of transform coefficients to a receiver main part 2. The receiver main part 2, which has the same configuration as that shown in FIG. 1(B), decodes the code words to reproduce a series of transform coefficients and then carries out the inverse discrete cosine transform coding for the series of transform coefficients, so that the picture information is reproduced. According to the first preferred embodiment of the present invention, an aliasing distortion occurrence prediction unit 3, and an image processing unit 4 are added to the receiver main part 2. That is, a receiver is configured by the receiver main part 2, the aliasing distortion occurrence prediction unit 3 and the image processing unit 4. It should be noted that no change is provided with the transmitter. The first embodiment of the present invention is directed to improving the aliasing distortion by only modifying the structure of the receiver.

The aliasing distortion occurrence prediction unit 3 (hereinafter simply referred to as a prediction unit 3) predicts the occurrence of an aliasing distortion in the block unit from the transform coefficients obtained for each block, and outputs a prediction result for each block. When the prediction result is output by the prediction unit 3, the image processing unit 4 carries out a picture processing for improving the aliasing distortion which will occur in the corresponding block. For example, the image processing unit 4 carries out a conventional an edge-held noise eliminating process.

For example, the prediction unit 3 is designed to determine whether or not the aliasing distortion will occur from the transform coefficients related to the block being considered by detecting the total energy (magnitude) of all AC (alternating current) components related to the block and comparing the total energy of the AC components with a predetermined threshold level. When it is determined that the total energy is greater than the threshold level, the prediction unit 3 supplies the image processing unit 4 with the prediction result indicating the possibility that the aliasing distortion will occur.

Figure 4:
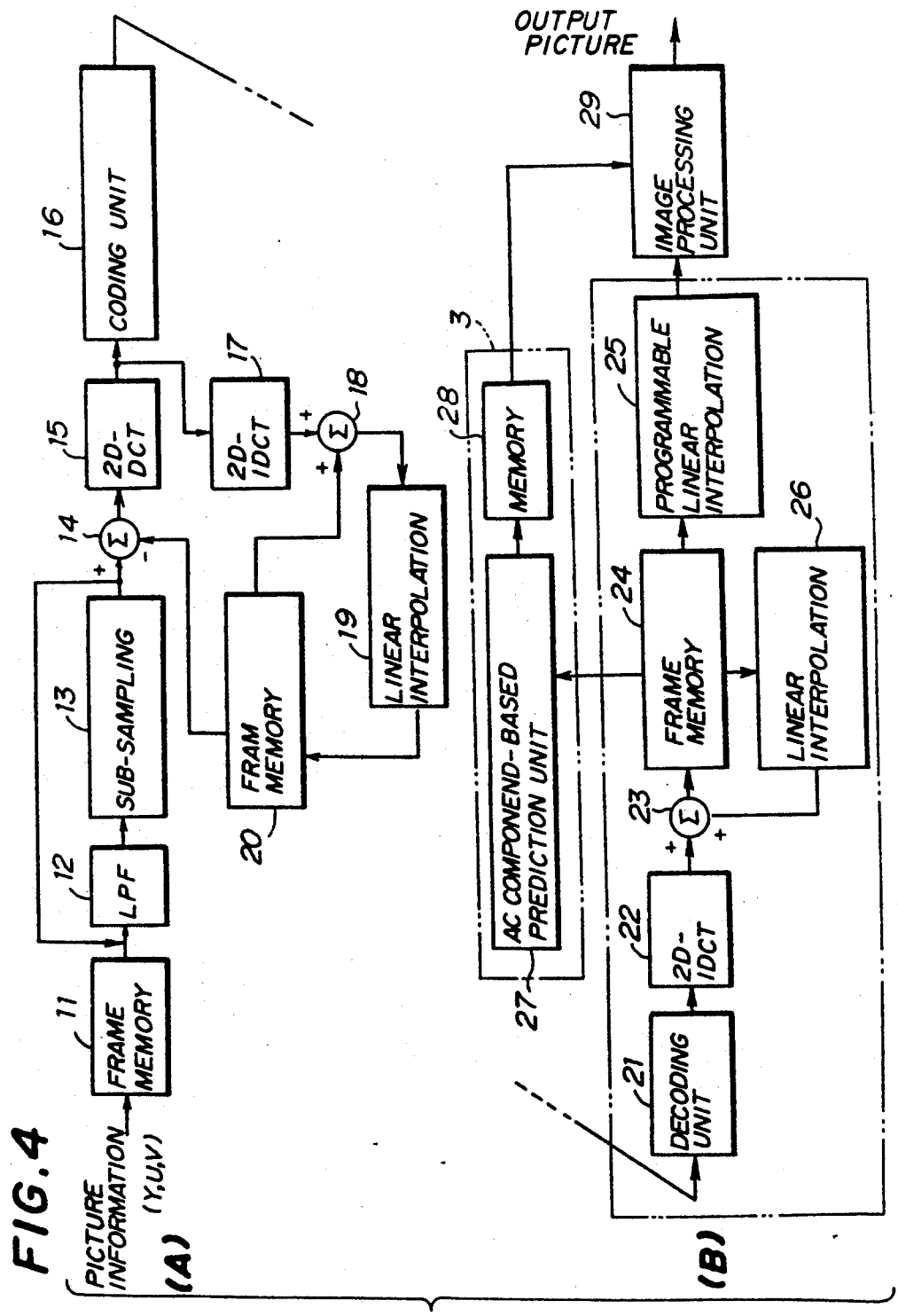
FIG. 4 is a block diagram illustrating of the structure of the discrete cosine transform coding system according to the first preferred embodiment of the present invention.

FIG. 4 illustrates a block diagram illustrating the details of the structure shown in FIG. 3. In FIG. 4, those parts which are the same as those given in the previous drawings are given the same reference numerals. The structure of the transmitter 1 shown in FIG. 4(A) is the same as that shown in FIG. 1(A). The receiver is configured by adding the prediction unit 4 and an image processing unit 29 corresponding to the image processing unit 4 shown in FIG. 3 to the receiver main part 2 having the same structure as that shown in FIG. 1(B).

The prediction unit 3 shown in FIG. 4 is composed of an AC component-based predictor 27 and a prediction result storage unit 28. Hereafter, the AC component-based predictor 27 is simply referred to as a predictor 27. As has been described previously, the frame memory 24 stores information about the reproduced picture amounting to one picture plane. The predictor 27 receives the above picture information from the frame memory 24, and calculates the total energy of all AC component coefficients of the transform coefficients obtained in the block unit. Then, the predictor 27 predicts whether or not the aliasing distortion will occur in the block being considered. The prediction result obtained for each block is represented by a one-bit prediction result signal. For example, the one-bit prediction result signal is "1" when the occurrence of the aliasing distortion is predicted.

The prediction result storage unit 28 has a frame memory having a number of blocks forming one picture plane. The one-bit prediction result information is written into a one-bit storage area related to the corresponding block. The image processing unit 29 refers to the prediction result storage unit 28 and carries out the aliasing distortion improving process for each block in which the occurrence of the aliasing distortion is predicted by the predictor 27. The output signal from the programmable linear interpolation unit 25 related to each block in which the occurrence of the aliasing distortion is not predicted passes through the image processing unit 29.

Figure 5:
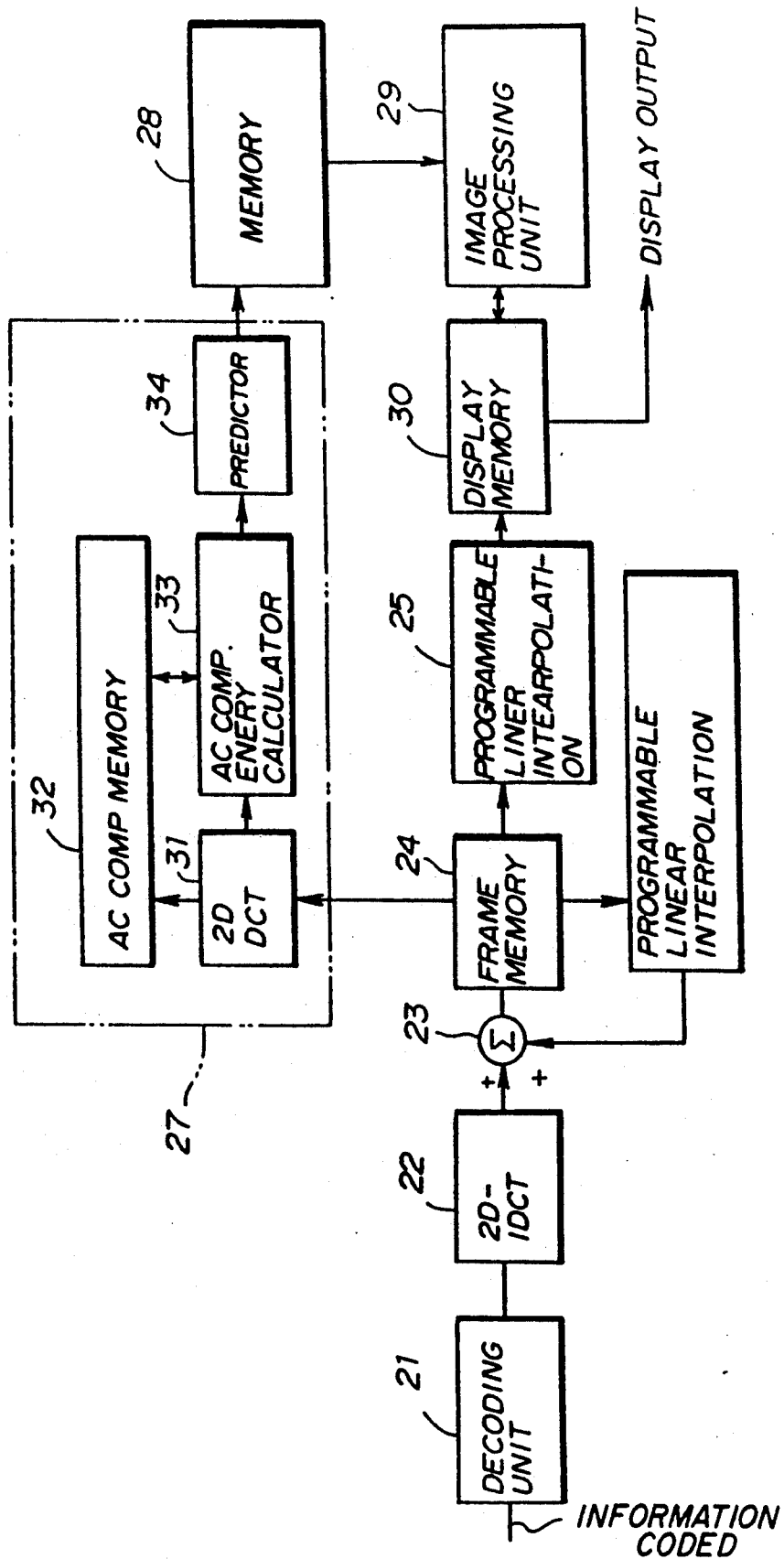
FIG. 5 is a block diagram illustrating the details of the structure of an AC component-based prediction unit shown in FIG. 4.

FIG. 5 illustrates the details of the predictor 27. As shown, the predictor 27 is composed of a two-dimensional discrete cosine transform unit 31, an AC component storage memory 32, an AC component energy calculation unit 33, and an aliasing distortion predictor 34. A display memory 30 is provided between the programmable linear interpolation unit 25 and the image processing unit 29. The display memory 30 stores the linearly interpolated picture output signal generated by the programmable linear interpolation unit 25 and having information amounting to one picture plane. The picture signal having information amounting to one picture plane is read out from the display memory 30 and sent to a display device (not shown).

The two-dimensional discrete cosine transform unit 31 carries out the two-dimensional discrete cosine transform for each of the blocks contained in the information about the reproduced one picture plane stored in the frame memory 24, and generates a series of transform coefficients representing information on the differential picture. As has been described previously, the series of transform coefficients has the frequency domain. The AC component storage memory 32 stores only the AC components contained in the frequency-domain output signal from the two-dimensional discrete cosine transform unit 31 related to one block. The AC component energy calculator 33 the sum total of the energy amounts of all the AC components stored in the AC component storage memory 32. The aliasing distortion predictor 34 recognizes the block being considered to have high-order transform coefficients (high frequencies) when the sum total of the energy amounts of the AC components is greater than a predetermined threshold level, and generates the one-bit prediction result signal indicating that the occurrence of the aliasing noise in the block being considered is predicted. The prediction result storage unit 28 stores the prediction result obtained for each of the blocks.

The image processing unit 29 carries out the aliasing distortion improving process for each block indicated by the content of the prediction result storage unit 28 ("1"). The image processing unit 29 does not carry out the aliasing distortion improving process for each block which is not indicated by the content of the prediction result storage unit 28 ("0"). If the aliasing distortion improving process is carried out for the blocks which do not have the possibility of the occurrence of the aliasing distortion, the quality of picture portions related to such blocks will deteriorate.

The blocks in which the occurrence of the aliasing distortion is predicted are subjected to the aliasing distortion improving process. For example, the image processing unit 29 carries out a conventional edge-held noise eliminating process in which a noise is eliminated without destroying the originality of the picture portions related to the blocks. In this process, data related to the pixel of concern is corrected on the basis of data related to peripheral pixels, as will be described later.

FIG. 6 is a flowchart illustrating the operation of the predictor 27. One picture plane consists of a plurality of blocks (25 blocks in the case shown in FIG. 6). One block consists of M×N pixels where M and N are integers. In the case shown in FIG. 6, one block consists of 16 pixels (M=N=4). Picture information in one block is subjected to the two-dimensional discrete cosine transform, so that the transform coefficients having a DC transform component and AC transform components is generated. At step 101, the AC component energy calculator 33 shown in FIG. 5 calculates the total energy of the AC components by using the following formula:

$$E = \sum_{j=0}^{M-1} \sum_{j=0}^{N-1} (y_{ij})^2 - (y_{00})^2 \quad (1)$$

where E is the total of the AC components, $y_{ij}$ is the value of the transform coefficient (signal level), $y_{00}$ is the value of the DC component (coefficient), and M and N indicate the size of the block.

At steps 102 and 103, the prediction distortion predictor 34 predicts whether or not the aliasing distortion in the block being considered will occur by comparing the total energy E of the AC components with the threshold level indicated by "TH". When it is determined that the total energy E is greater than the threshold level TH, at step 104, the one-bit prediction result having a value of 1 is written into the corresponding storage area of the prediction result storage unit 28 related to the block being considered. On the other hand, when it is determined, at step 103, that $E \leq TH$, the one-bit prediction result having a value of 0 is written into the corresponding storage area of the prediction result storage unit 28 related to the block being considered. At step 106, the AC component energy calculator 33 determines whether or not all the blocks in the one picture plane being considered have been processed. When the result at step 106 is NO, the next block is processed in the above-mentioned way. On the other hand, when the result at step 106 is YES, the procedure ends.

Figure 7B:
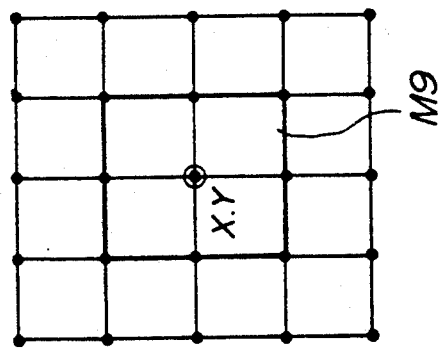
FIGS. 7A and 7B are diagrams illustrating an aliasing distortion improving process carried out by an image processing unit shown in FIG. 5.
Figure 7A:
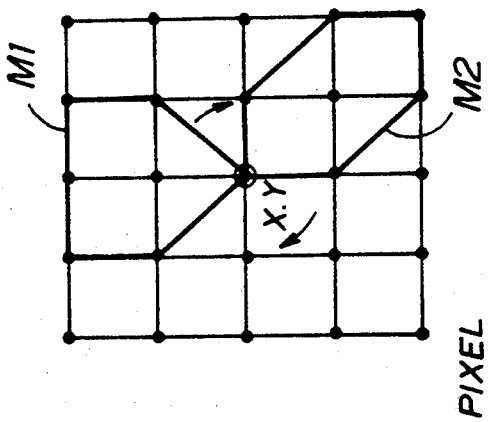

FIGS. 7A and 7B illustrate the conventional edge-held noise eliminating process (smoothing process) which is executed by the image processing unit 29 shown in FIG. 5. It is now assumed that the pixel being considered has coordinates X and Y. The image processing unit 29 refers to 25 pixels in the periphery of the pixel being considered. More specifically, eight masks are used in the way shown in FIG. 7A. Two of the eight masks M1 and M2 are illustrated in FIG. 7A. Each of the eight masks has pixels which are arranged at the corners of an imaginary pentagon or hexagon and include the pixel being considered. FIG. 7B illustrates a mask M9 consisting of 9 pixels (3×3) and including the pixel being considered in the center thereof. In order to determine the value of data related to the pixel being considered, the above-mentioned nine different masks are used. The image processing unit 29 identifies one mask having the least distribution of the values of the pixel data on the masks, and then calculates the average of the data values of the pixels related to the identified mask having the least distribution. In this way, the data related to each pixel of the block in which the occurrence of the aliasing noise is predicted is corrected, and is substituted for the data value of the corresponding pixel.

Figure 8:
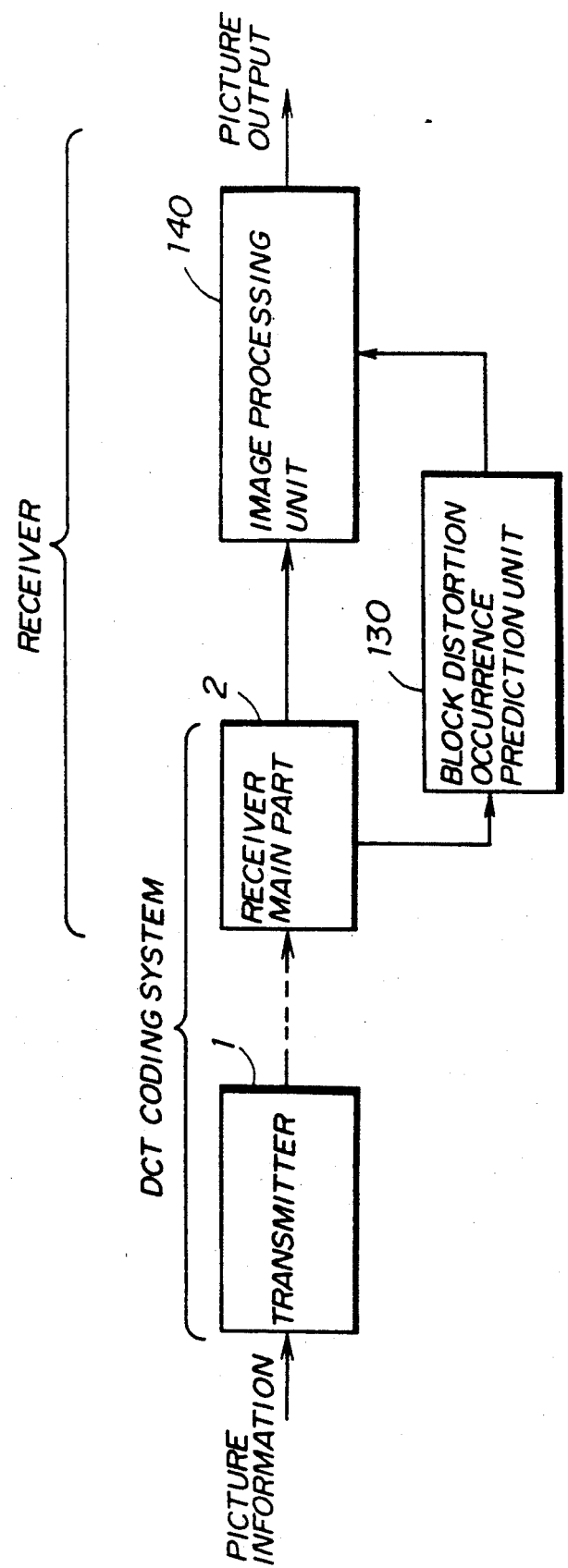
FIG. 8 is a block diagram of an outline of a discrete cosine transform coding system having an improved receiver (decoder) according to a second preferred embodiment of the present invention.

A description will now be given of a second preferred embodiment of the present invention, which is directed to improving the block distortion. Referring to FIG. 8, there is illustrated an outline of the second preferred embodiment of the present invention. In FIG. 8, those parts which are the same as those shown in the previous drawings are given the same reference numerals. A receiver according to the second embodiment of the present invention is configured by adding a block distortion occurrence prediction unit 130 and an image processing unit 140 to the receiver main part 2, as shown in FIG. 8. Hereafter, the block distortion occurrence prediction unit 130 is simply referred to as a prediction unit 130.

The prediction unit 130 predicts, in the block unit, whether or not the block distortion will take place by using the transform coefficients transferred in the block unit. For example, the prediction unit 130 is designed to determine whether or not the difference between the level of the DC component (transform coefficient) being considered and that of each of the four adjacent blocks is greater than a predetermined threshold level. When the occurrence of the block distortion is predicted, the image processing unit 140 carries out a block distortion improving process by, for example, eliminating high-frequency components of the AC components (transform coefficients). It should be noted that the occurrence of the block distortion is predicted and the block distortion improving process is carried out on the receiver side.

Figure 9:
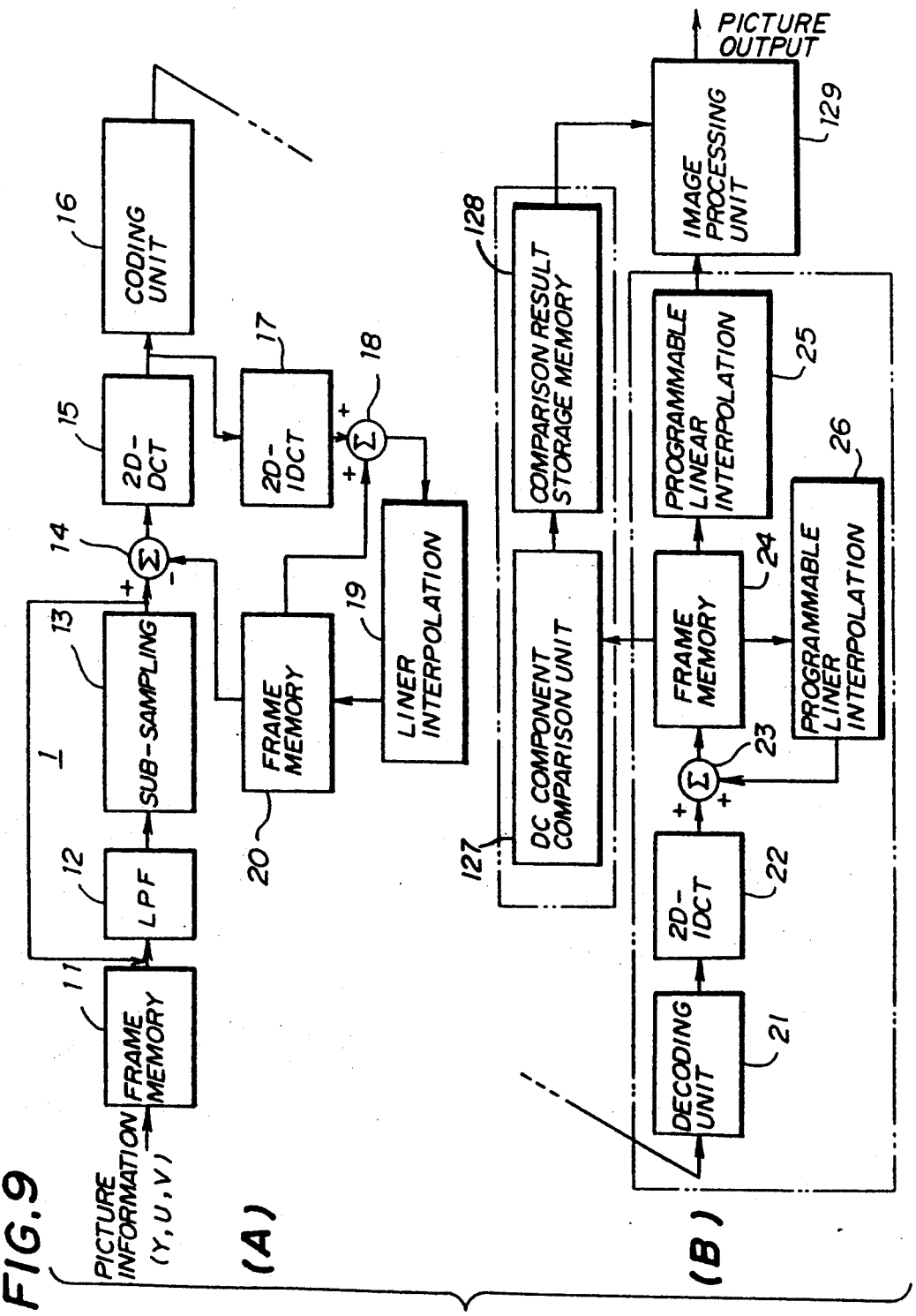
FIG. 9 is a block diagram illustrating the structure of the discrete cosine transform coding system shown in FIG. 8.

FIG. 9 illustrates the details of the second preferred embodiment of the present invention. In FIG. 9, those parts which are the same as those shown in the previous figures are given the same reference numerals. The transmitter 1 shown in FIG. 9(A) is the same as that shown in FIG. 1(A). The block distortion occurrence prediction unit 130 of the receiver shown in FIG. 9(B) is composed of a DC component comparison unit 127 and a comparison result storage unit 128. The DC component comparison unit 127 compares the value (magnitude) of the DC component coefficient related to the block being considered with that of the DC component coefficient of each of the four adjacent blocks. Then, the DC component comparison unit 127 compares the calculated difference obtained for each of the four adjacent blocks with the predetermined threshold level. If at least one of the comparison results is affirmative, the DC component comparison unit 127 concludes that the occurrence of the block distortion is predicted in the block being considered, and outputs a one-bit prediction result signal to the comparison result storage unit 128. The comparison result storage unit 128 stores the one-bit prediction result signal obtained for each of the blocks in one picture plane. The image processing unit 129 refers to the content of the comparison result storage unit 128, and carries out a lowpass filtering operation for only a picture portion in which the occurrence of the block distortion is predicted. Thereby, the two adjacent blocks are smoothly jointed together. The lowpass filtering operation is not carried out for a picture portion in which the occurrence of the block distortion is not predicted.

Figure 10:
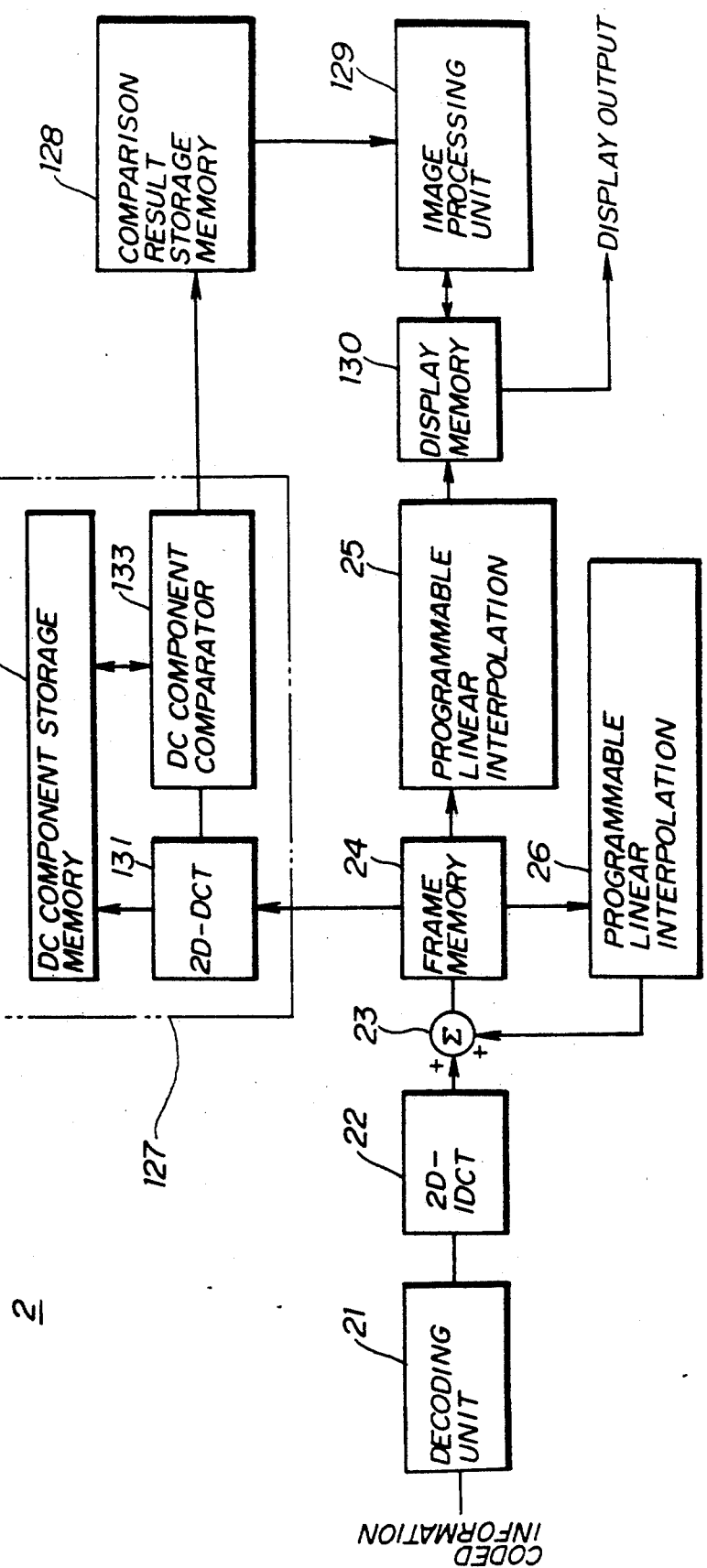
FIG. 10 is a block diagram illustrating the details of a DC component comparison unit shown in FIG. 9.

Referring to FIG. 10, there is illustrated the structure of the DC component comparison unit 127. In FIG. 10, those parts which are the same as those shown in FIG. 9 are given the same reference numerals. The DC component comparison unit 127 is composed of a two-dimensional discrete cosine transform unit 131, a DC component storage memory 132 and a DC component comparator 133. A display memory 130 is provided between the programmable linear interpolation unit 25 and the image processing unit 129 in the same way as the display memory 30 shown in FIG. 5. The display memory 130 stores the linearly interpolated picture output signal which is supplied from the programmable linear interpolation unit 25 and which amounts to one picture plane.

The discrete cosine transform unit 131 carries out the two-dimensional discrete cosine transform for the information about the reproduced picture amounting to one picture plane, and generates a series of transform coefficients in the frequency domain which represent information on each differential picture. The DC component storage memory 132 stores, in the block unit, the DC component of the frequency domain output signal from the discrete cosine transform unit 131. The DC component comparator 133 compares the DC component related to the block being considered read out from the discrete cosine transform unit 131 with the DC components related to the adjacent blocks, and outputs the differences therebetween. Then, the DC component comparator 133 compares each of the differences with the predetermined threshold level, and respectively outputs the one-bit prediction result signal. The comparison result storage unit 128 stores the one-bit prediction result signal in a corresponding one-bit area thereof. The image processing unit 129 carries out the block distortion improving process for the picture portion in which the occurrence of the block distortion is predicted. The block distortion improving process is not carried out for the other picture portions in which the occurrence of the block distortion is not predicted.

Figure 11A:
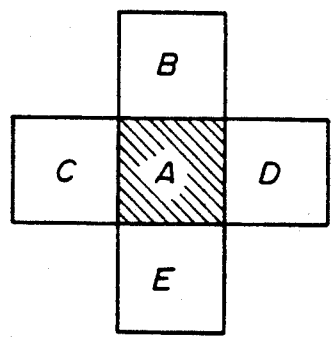
FIGS. 11A and 11B are diagrams illustrating the operation of the DC component comparison unit shown in FIG. 10.
Figure 11B:
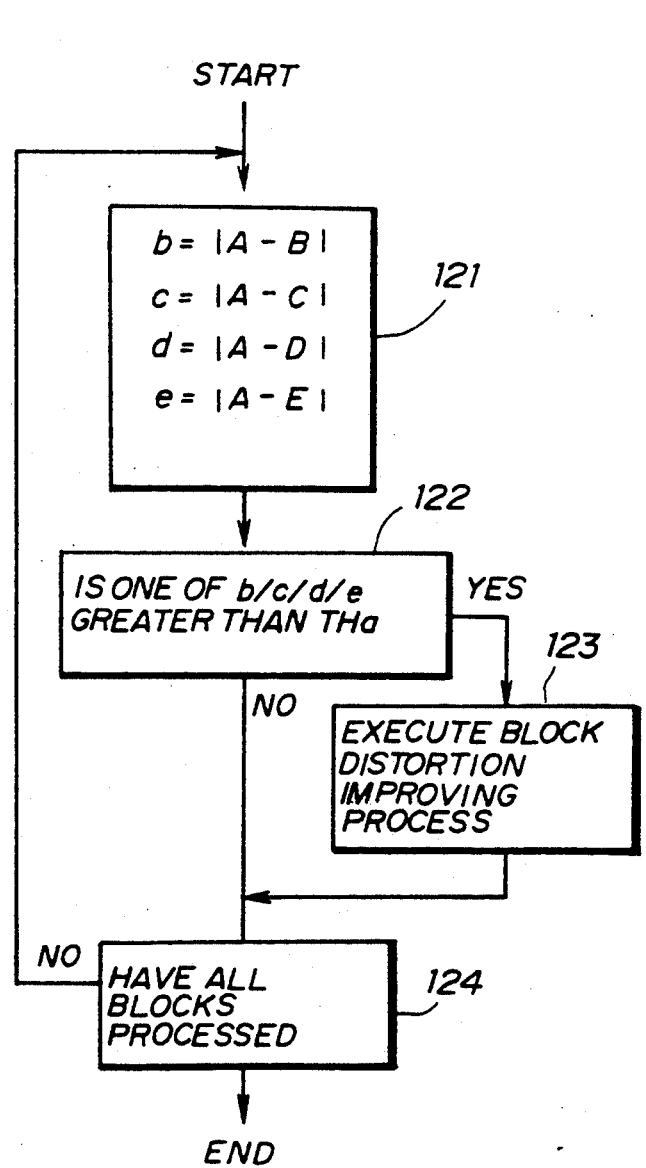

FIG. 11A illustrates a block A being concerned (illustrated by the hatched block) and four adjacent blocks B, C, D and E. FIG. 11B illustrates the operation of the DC component comparison unit 127 shown in FIG. 10. A picture portion is considered as a portion in which there is a difference between the trends of changes of the signal levels in the adjacent blocks and thus there is a difference between the averages of the signal levels therein. Thus, at step 121 shown in FIG. 11B, the DC component comparator 133 calculates the differences, b, c, d and e between the value of the DC component (transform coefficient) of the block A with the values of the DC components of the blocks B, C, D and E. That is, the DC component comparator 133 calculates the following equations:

$$b = |A - B|$$

$$c = |A - C|$$

$$d = |A - D|$$

$$e = |A - E|$$

At step 122, the DC component comparator 133 compares each of the four comparison results with the predetermined threshold value labeled THa. If at least one of the differences b, c, d and e is greater than the threshold level THa, the DC component comparator 133 concludes that the occurrence of the block distortion is predicted in the block A being considered.

FIG. 12A-(a) illustrates the relationship between the DC component level and the blocks obtained before the block distortion improving process (lowpass filtering process) in the image processing unit 129 is carried out, and FIG. 12A-(b) illustrates the relationship between the DC component level and the blocks obtained after the block distortion improving process (lowpass filtering process) in the image processing unit 129 is carried out. In the case shown in FIG. 12A, the image processing unit 129 employs a lowpass filter shown in FIG. 12B. If the difference between the DC component levels related to the adjacent blocks is greater than twice a change unit (which is illustrated in FIG. 12A-(a)), the block being considered is subjected to the lowpass filtering process using the lowpass filter shown in FIG. 12B. The pixel illustrated by the hatching shown in FIG. 12B is the pixel being considered. Each of the 8×8 pixels in the block being considered is subjected to the lowpass filtering process using the lowpass filter shown in FIG. 12B. It is possible to filter a peripheral two-pixel area of the block by using a lowpass filter having a characteristic different from that applied for the pixels other than the pixels in the peripheral two-pixel area.

The lowpass filter shown in FIG. 12B is defined by the following formula:

$$y(i, j) = F/64$$

$$
\begin{aligned}
F = & [x(i-2, j-2) + x(i+2, j-2) + \\
& x(i-2, j+2) + x(i+2, j+2)] \times 1 + \\
& [x(i-1, j-2) + x(i+1, j-2) + x(i-2, j-1) + \\
& x(i+2, j-1) + x(i+1, j-2) + x(i+1, j+2) + \\
& x(i-1, j+2) + x(i+2, j+1)] \times 2 + \\
& x(i, j-2) + x(i-1, j-1) + x(i+1, j-1) + \\
& x(i-2, j) + x(i+2, j) + x(i-1, j+1) + \\
& x(i+1, j+1), + x(i, j+2)] \times 3 + \\
& [x(i, j-1) + x(i-1, j) + x(i+1, j) + \\
& x(i, j+1)] \times 4 + x(i, j)] \times 5.
\end{aligned}
$$

It can be seen form FIG. 5 that the high-frequency components in the blocks having more than twice the change unit are eliminated due to the function of the lowpass filter shown in FIG. 12B, so the adjacent blocks are smoothly joined together. On the other hand, no filtering process is carried out for the blocks equal to or less than twice the change unit.

Figure 13:
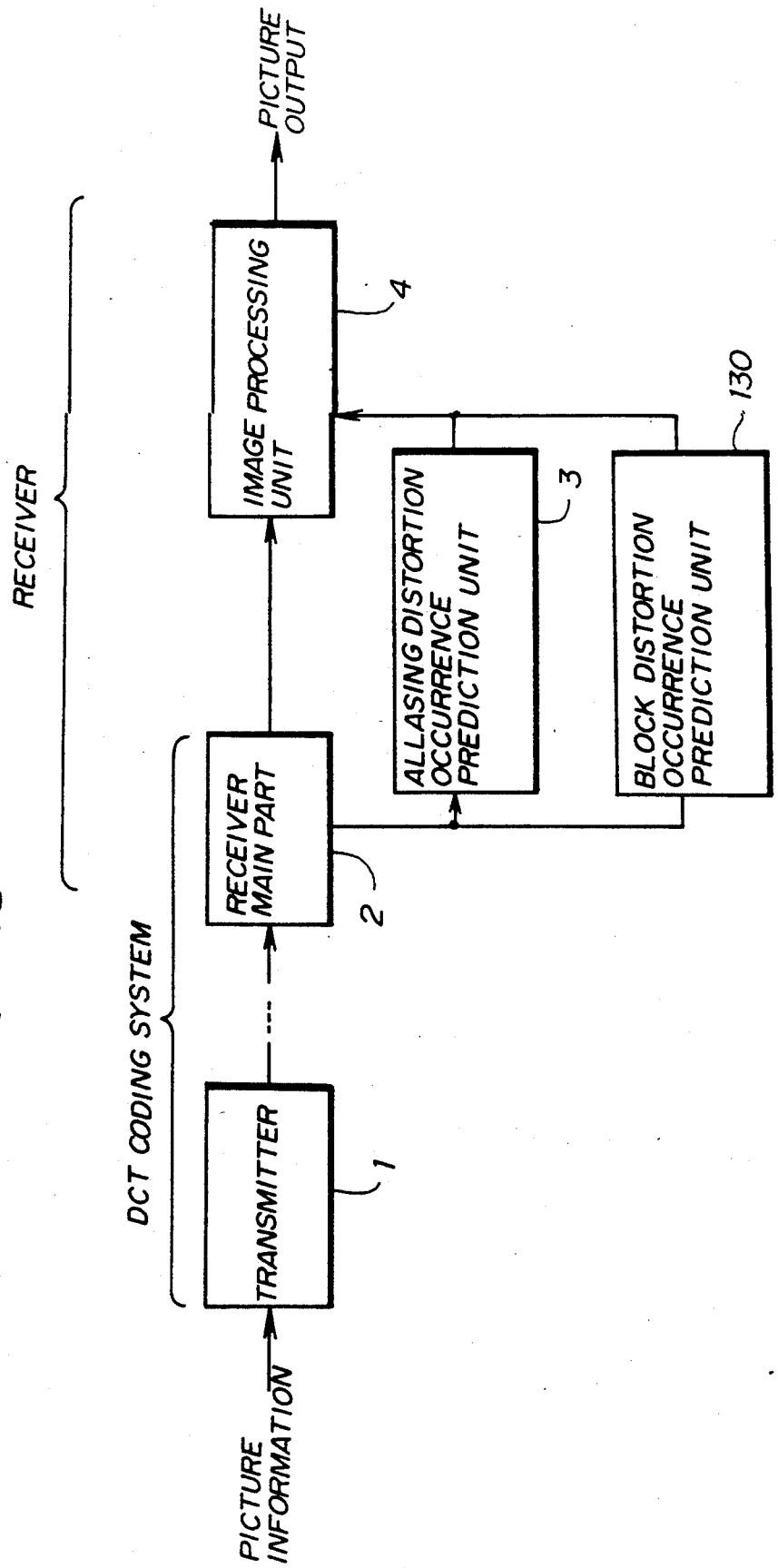
FIG. 13 is a block diagram illustrating an outline of a discrete cosine transform coding system having an improved receiver according to a third preferred embodiment of the present invention.

FIG. 13 is a block diagram of a third preferred embodiment of the present invention. The configuration shown in FIG. 13 is obtained by combining the first and second embodiments of the present invention, as shown in FIG. 13. The aforementioned aliasing distortion generation prediction unit 3 and the aforementioned block distortion occurrence prediction unit 130 are connected in parallel form with each other.

The present invention is not limited to the specifically disclosed embodiments, and variations and modifications may be made without departing from the scope of the present invention.

What is claimed is:

1. A coded picture information decoding apparatus comprising:

decoder means for decoding a code word corresponding to a series of transfer coefficients obtained by carrying out a discrete cosine transform for picture information to be transmitted in a block unit obtained by dividing said picture information on a coder side and for reproducing said series of transfer coefficients;

inverse transform means, coupled to said decoder means, for carrying out an inverse discrete cosine transform for said series of transfer coefficients reproduced by said decoder means in the block unit and for outputting reproduced picture information;

prediction means, coupled to inverse transform means, for predicting, in the block unit, whether or not a picture distortion will occur on the basis of said transfer coefficients obtained in the block unit and for outputting a prediction result obtained in the block unit; and image processing means, coupled to said inverse transform means and said prediction means, for carrying out a predetermined image process of preventing the occurrence of said picture distortion for said reproduced picture information related to a block indicated by said prediction result showing that the occurrence of the picture distortion is predicted.

2. A coded picture information decoding apparatus as claimed in claim 1, wherein said prediction means comprises means for predicting, in the block unit, whether or not an aliasing distortion will occur on the basis of said transfer coefficients obtained in the block unit and for outputting the prediction result obtained in the block unit.

3. A coded picture information decoding apparatus as claimed in claim 1, wherein:

said prediction means comprises means for predicting, in the block unit, whether or not a block distortion will occur on the basis of said transfer coefficients obtained in the block unit and for outputting the prediction result obtained in the block unit; and said block distortion arises from a fact that a reproduced picture is formed by said reproduced picture information generated from the transfer coefficients related to a plurality of blocks.

4. A coded picture information decoding apparatus as claimed in claim 1, wherein said prediction means comprises AC (alternating current) component-based prediction means for extracting AC components from said transform coefficients in the block unit and for predicting, in the block unit, whether or not the picture distortion will occur on the basis of said AC components.

5. A coded picture information decoding apparatus as claimed in claim 4, wherein:

said prediction means comprises energy calculating means for calculating a total energy of said AC components in the block unit and for comparing said total energy with a predetermined threshold level; and said AC component-based prediction means comprises means for predicting, in the block unit, whether or not the picture distortion will occur on the basis of a comparison result obtained by said energy calculating means in the block unit.

6. A coded picture information decoding apparatus as claimed in claim 5, further comprising memory means for storing said comparison result obtained by said energy calculating means in the block unit, wherein said image processing means carries out said predetermined image process for said reproduced picture information related to a block indicated by said comparison result stored in said memory means and showing that the occurrence of the picture distortion is predicted.

7. A coded picture information decoding apparatus as claimed in claim 1, wherein said image processing means comprises means for determining data related to a pixel contained in said block indicated by said prediction result showing that the occurrence of the picture distortion is predicted, by referring to data related to pixels located in a periphery of said pixel.

8. A coded picture information decoding apparatus as claimed in claim 1, wherein said prediction means comprises DC (direct current) component-based prediction means for extracting a DC component from said transform coefficients in the block unit and for predicting, in the block unit, whether or not the picture distortion will occur on the basis of said DC component.

9. A coded picture information decoding apparatus as claimed in claim 8, wherein:

one picture plane is composed of a plurality of blocks arranged in a two dimension;

said prediction means comprises comparing means for comparing a level of the DC component related to a block being considered with a level of the DC component related to each of adjacent blocks adjacent to said block being considered; and said DC component-based prediction means comprises means for predicting, in the block unit, whether or not the picture distortion will occur on the basis of a comparison result obtained by said comparing means.

10. A coded picture information decoding apparatus as claimed in claim 8, wherein:

one picture plane is composed of a plurality of blocks arranged in a two dimension;

wherein said prediction means comprises:

first comparing means for respectively comparing a level of the DC component related to a block being considered with levels of DC components respectively related to adjacent blocks adjacent to said block being considered and for respectively outputting comparison results obtained for the adjacent blocks and indicating differences between the level of said DC component related to the block being considered and the levels of the DC components related to the adjacent blocks; and second comparing means for respectively comparing said comparison results obtained for the adjacent blocks with a predetermined threshold level and for outputting a prediction result showing whether or not there is at least one of the comparison results which is greater than said predetermined threshold level, and wherein said image processing means carries out said predetermined image process for said reproduced picture information related to the block being considered when said second comparing means outputs the prediction result which shows that there is at least one of the comparison results which is greater than said predetermined threshold level.

11. A coded picture information decoding apparatus as claimed in claim 10, further comprising memory means for storing said prediction result obtained for each of the blocks, wherein said image processing means comprises filter means for filtering picture information related to said block being considered when the prediction result stored in the memory means shows that there is at least one of the comparison results which is greater than said predetermined threshold level.

12. A coded picture information decoding apparatus as claimed in claim 11, wherein said filter means comprises lowpass filter means for preventing high-frequency components of said picture information from passing therethrough.

13. A coded picture information decoding apparatus as claimed in claim 1, further comprising means for generating transform coefficients from said reproduced picture information and for supplying said transform coefficients to said prediction means.

14. A coded picture information decoding means as claimed in claim 1, wherein said series of transfer coefficients comprises transfer coefficients obtained by hierarchically carrying out a discrete cosine transform for picture information to be transmitted in the block unit obtained by dividing said picture information on the coder side.

* * * * *